(12) United States Patent
Yang et al.

(10) Patent No.: US 8,917,603 B2
(45) Date of Patent: Dec. 23, 2014

(54) METHOD FOR TRANSMITTING CONTROL INFORMATION AND APPARATUS THEREFOR

(75) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/117,310

(22) PCT Filed: May 14, 2012

(86) PCT No.: PCT/KR2012/003755
§ 371 (c)(1),
(2), (4) Date: Dec. 11, 2013

(87) PCT Pub. No.: WO2012/154013
PCT Pub. Date: Nov. 15, 2012

(65) Prior Publication Data
US 2014/0105076 A1 Apr. 17, 2014

Related U.S. Application Data

(60) Provisional application No. 61/485,185, filed on May 12, 2011.

(51) Int. Cl.
*H04J 3/00* (2006.01)
*H04W 72/04* (2009.01)
*H04J 3/16* (2006.01)
*H04L 5/00* (2006.01)
*H04L 5/14* (2006.01)

(52) U.S. Cl.
CPC ............... *H04J 3/1694* (2013.01); *H04L 5/001* (2013.01); *H04W 72/0413* (2013.01); *H04L 5/14* (2013.01)
USPC ........... 370/235; 370/278; 370/280; 370/282; 370/294

(58) Field of Classification Search
None
See application file for complete search history.

(56) References Cited

U.S. PATENT DOCUMENTS

2010/0135181 A1* 6/2010 Earnshaw et al. ............. 370/252
2011/0059764 A1* 3/2011 Dai et al. ...................... 455/522

FOREIGN PATENT DOCUMENTS

WO  WO 2010/082757 A2  7/2010

* cited by examiner

*Primary Examiner* — Jeffrey M Rutkowski
*Assistant Examiner* — Hardikkumar Patel
(74) *Attorney, Agent, or Firm* — Birch, Stewart, Kolasch & Birch, LLP

(57) ABSTRACT

The present invention relates to a wireless communication system. In more detail, the present invention relates to a method and device for transmitting uplink control information in a wireless communication system that supports carrier merging and operates in TDD, and the method comprises the following steps: receiving at least one or more than one PDCCH and more than one PDSCH from a plurality of downlink sub frames according to a UL-DL configuration: determining a bit number of reception response information on the at least one of more than one PDCCH and more than one PDSCH by using a value indicated by a predetermined 2-bit field in a DCI format for UL scheduling; and transmitting the reception response information through PUSCH corresponding to the DIC format.

8 Claims, 16 Drawing Sheets

METHOD FOR TRANSMITTING CONTROL INFORMATION AND APPARATUS THEREFOR

This application is the National Phase of PCT/KR2012/003755 filed on May 14, 2012, which claims priority under 35 U.S.C. 119(e) to U.S. Provisional Application No. 61/485,185 filed on May 12, 2011, all of which are hereby expressly incorporated by reference into the present application.

TECHNICAL FIELD

The present invention relates to a wireless communication system and, more specifically, to a method for transmitting control information and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently transmitting control information in a wireless communication system and an apparatus for the same. Another object of the present invention is to provide a method and apparatus for efficiently transmitting uplink control information in a time division duplexing (TDD) system and efficiently managing resources for the same. The technical problems solved by the present invention are not limited to the above technical problems and those skilled in the art may understand other technical problems from the following description.

Technical Solution

The object of the present invention can be achieved by providing a method for transmitting uplink control information in a wireless communication system supporting carrier aggregation and operating in TDD (time division duplex), including: receiving at least one of one or more PDCCHs (physical downlink control channels) and one or more PDSCHs (physical downlink shared channels) in a plurality of downlink subframes according to a UL-DL configuration; determining the number of bits of acknowledgement/negative acknowledgement (ACK/NACK) information on the at least one of the one or more PDCCHs and the one or more PDSCHs using a value indicated by a predetermined 2-bit field in a DCI (downlink control information) format for UL scheduling; and transmitting the ACK/NACK information through a PUSCH (physical uplink shared channel) corresponding to the DCI format, wherein the number of bits of the ACK/NACK information is determined using $V_{DAI}^{UL}+4\lceil(U_{max}-V_{DAI}^{UL})/4\rceil$ wherein $V_{DAI}^{UL}$ denotes the value indicated by the predetermined 2-bit field and is an integer in the range or 1 to 4, $U_{max}$ denotes a maximum value from among the numbers of PDSCH signals and PDCCH signals received in the plurality of downlink subframes for respective component carriers and $\lceil\ \rceil$ represents a ceiling function.

In another aspect of the present invention, provided herein is a communication device configured to transmit uplink control information in a wireless communication system supporting carrier aggregation and operating in TDD, including: a radio frequency (RF) unit; and a processor, wherein the processor is configured to receive at least one of one or more PDCCHs and one or more PDSCHs in a plurality of downlink subframes according to a UL-DL configuration, to determine the number of bits of ACK/NACK information on the at least one of the one or more PDCCHs and the one or more PDSCHs using a value indicated by a predetermined 2-bit field in a DCI format for UL scheduling and to transmit the ACK/NACK information through a PUSCH corresponding to the DCI format, wherein the number of bits of the ACK/NACK information is determined using $V_{DAI}^{UL}+4\lceil(U_{max}-V_{DAI}^{UL})/4\rceil$ wherein $V_{DAI}^{UL}$ denotes the value indicated by the predetermined 2-bit field and is an integer in the range or 1 to 4, $U_{max}$ denotes a maximum value from among the numbers of PDSCH signals and PDCCH signals received in the plurality of downlink subframes for respective component carriers and $\lceil\ \rceil$ represents a ceiling function.

The number of bits of the ACK/NACK information may be identical with a value determined using $V_{DAI}^{UL}+4\lceil(U_{max}-V_{DAI}^{UL})/4\rceil)\times(C+C_2)$ wherein C denotes the number of configured component carriers and $C_2$ denotes the number of component carriers supporting a maximum of 2 transport blocks and to which bundling is not applied.

The ACK/NACK information may include ACK/NACK information on one or more component carriers and the number of bits of ACK/NACK information for a c-th component carrier may be: $V_{DAI}^{UL}+4\lceil(U_{max}-V_{DAI}^{UL})/4\rceil)$ when a transmission mode supporting transmission of a single transport block is configured for the c-th component carrier or bundling is applied for the c-th component carrier; and ii) $2\times(V_{DAI}^{UL}+4\lceil(U_{max}-V_{DAI}^{UL})/4\rceil)$ when a transmission mode supporting transmission of two transport blocks is configured for the c-th component carrier and bundling is not applied thereto.

$V_{DAI}^{UL}+4\lceil(U_{max}-V_{DAI}^{UL})/4\rceil$ may correspond to the number of downlink subframes requiring feedback of ACK/NACK information for a corresponding component carrier.

The UL-DL configuration may be UL-DL configuration #5.

Advantageous Effects

According to the present invention, it is possible to efficiently transmit control information in a wireless communication system. Specifically, it is possible to efficiently transmit uplink control information in a TDD system and efficiently manage resources for the same.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
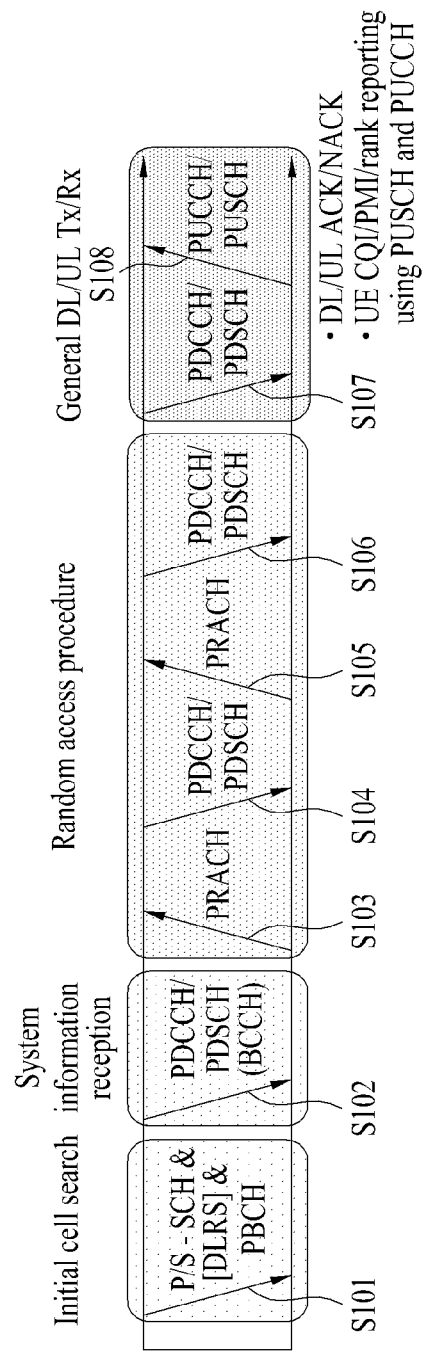
FIG. 1 illustrates physical channels used in a 3GPP LTE system as an exemplary wireless communication system and a signal transmission method using the same.

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

The terms used in the specification are described.

HARQ-ACK (Hybrid Automatic Repeat request-Acknowledgement): this represents an acknowledgment response to downlink transmission (e.g. PDSCH or SPS release PDCCH), that is, an ACK/NACK/DTX response (simply, ACK/NACK response, ACK/NACK). The ACK/NACK/DTX response refers to ACK, HACK, DTX or NACK/DTX. HARQ-ACK for a specific CC or HARQ-ACK of a specific CC refers to an ACK/NACK response to a downlink signal (e.g. PDSCH) related to (e.g. scheduled for) the corresponding CC. A PDSCH can be replaced by a transport block (TB) or a codeword.

PDSCH: this corresponds to a DL grant PDCCH. The PDSCH is used interchangeably with a PDSCH w/PDCCH in the specification.

SPS release PDCCH: this refers to a PDCCH indicating SPS release. A UE performs uplink feedback of ACK/NACK information about an SPS release PDCCH.

SPS PDSCH: this is a PDSCH transmitted on DL using a resource semi-statically set according to SPS. The SPS PDSCH has no DL grant PDCCH corresponding thereto. The SPS PDSCH is used interchangeably with a PDSCH w/o PDCCH in the specification.

DAI (Downlink Assignment Index): this is included in DCI transmitted through a PDCCH. The DAI can indicate an order value or counter value of a PDCCH. A value indicated by a DAI field of a DL grant PDCCH is called a DL DAI and a value indicated by a DAI field of a UL grant PDCCH is called a UL DAI for convenience.

CA based system: this refers to a wireless communication system capable of aggregating a plurality of component carriers (or cells). The CA based communication system can use only a single component carrier (or cell) or aggregate a plurality of component carriers (or cells) and use the aggregated component carriers according to configuration. The number of aggregated component carriers (or cells) can be independently determined for each UE.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement(ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
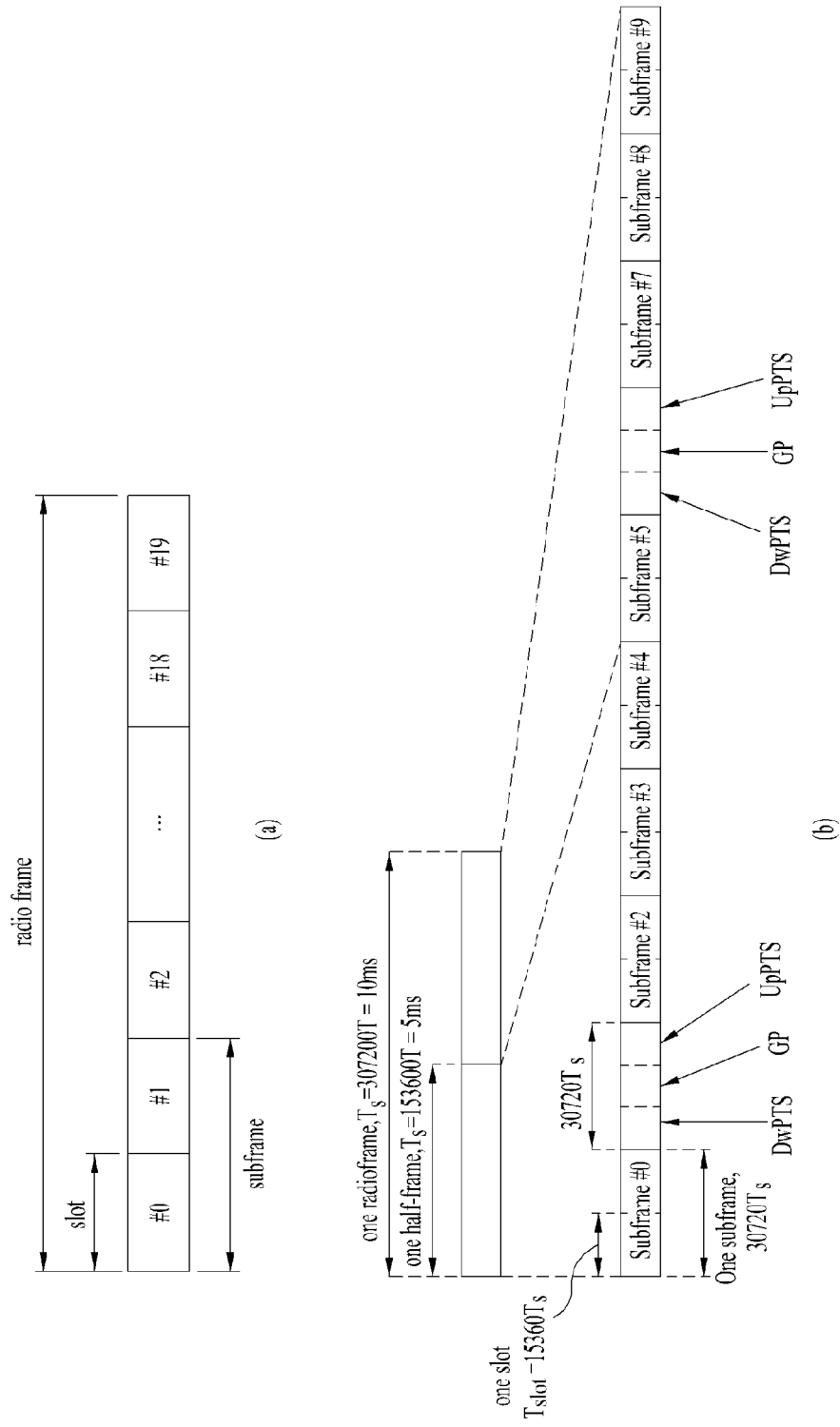
FIG. 2 illustrates a radio frame structure.

FIG. 2 illustrates a radio frame structure. In a cellular OFDM wireless packet communication system, uplink/downlink data packet transmission is performed on a sub-frame-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS), and one subframe consists of 2 slots. The DwPTS is used for initial cell search, synchronization or channel estimation. The UpPTS is used for channel estimation in a BS and UL transmission synchronization acquisition in a UE. The GP eliminates UL interference caused by multi-path delay of a DL signal between a UL and a DL.

Table 1 shows UL-DL configurations of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

The radio frame structure is merely exemplary and the number of subframes included in the radio frame, the number of slots included in a subframe, and the number of symbols included in a slot can be vary.

Figure 3:
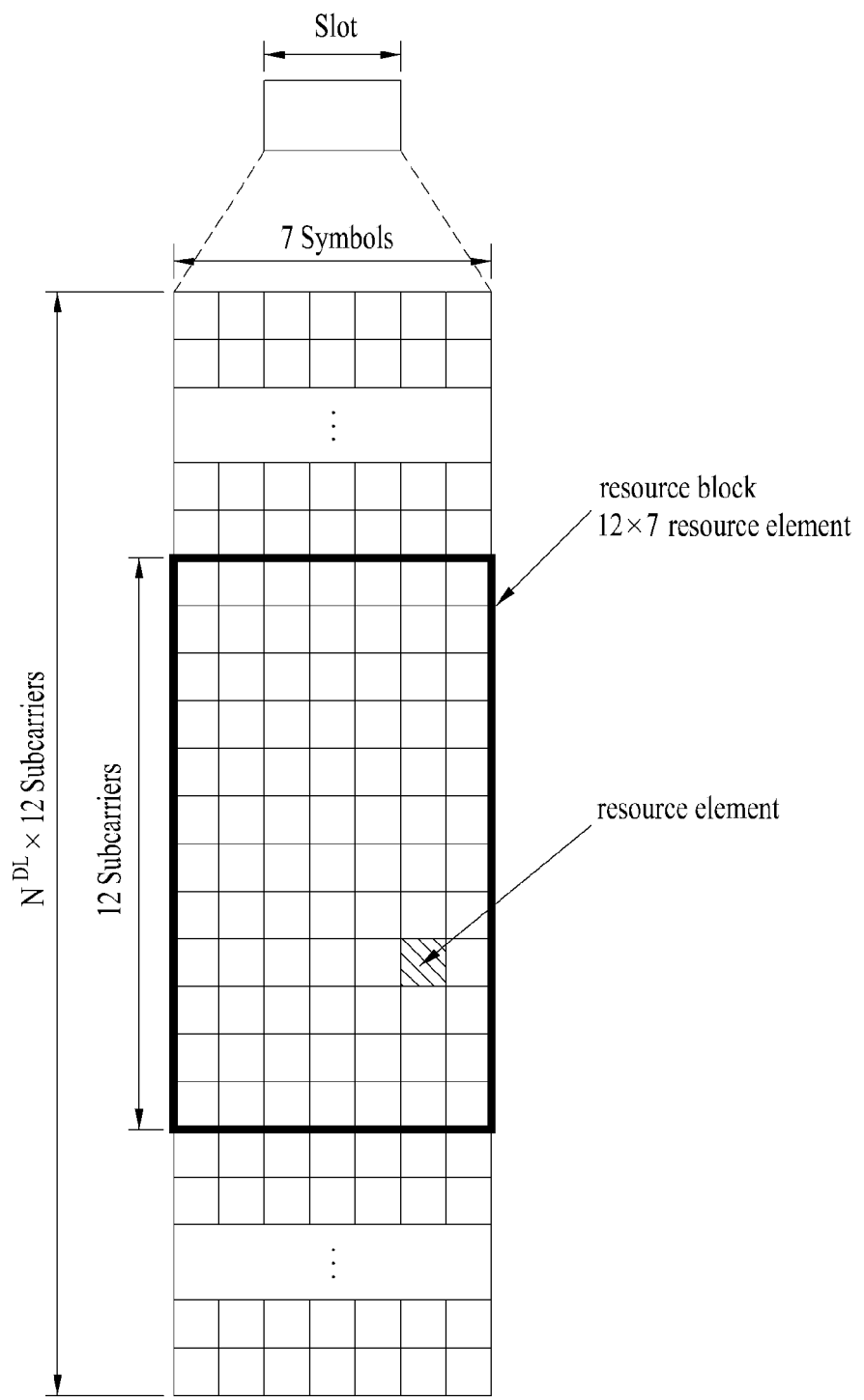
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 4:
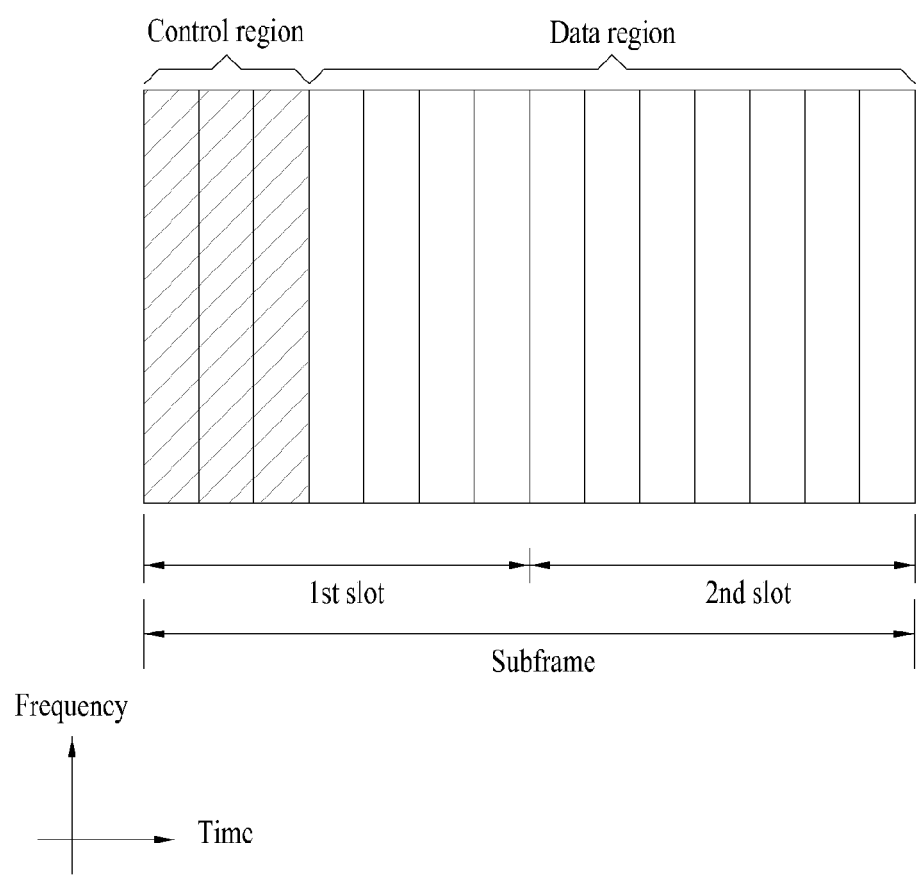
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift DM RS (Demodulation Reference Signal), CQI (Channel Quality Information) request, HARQ process number, TPMI (Transmitted Precoding Matrix Indicator), PMI (Precoding Matrix Indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
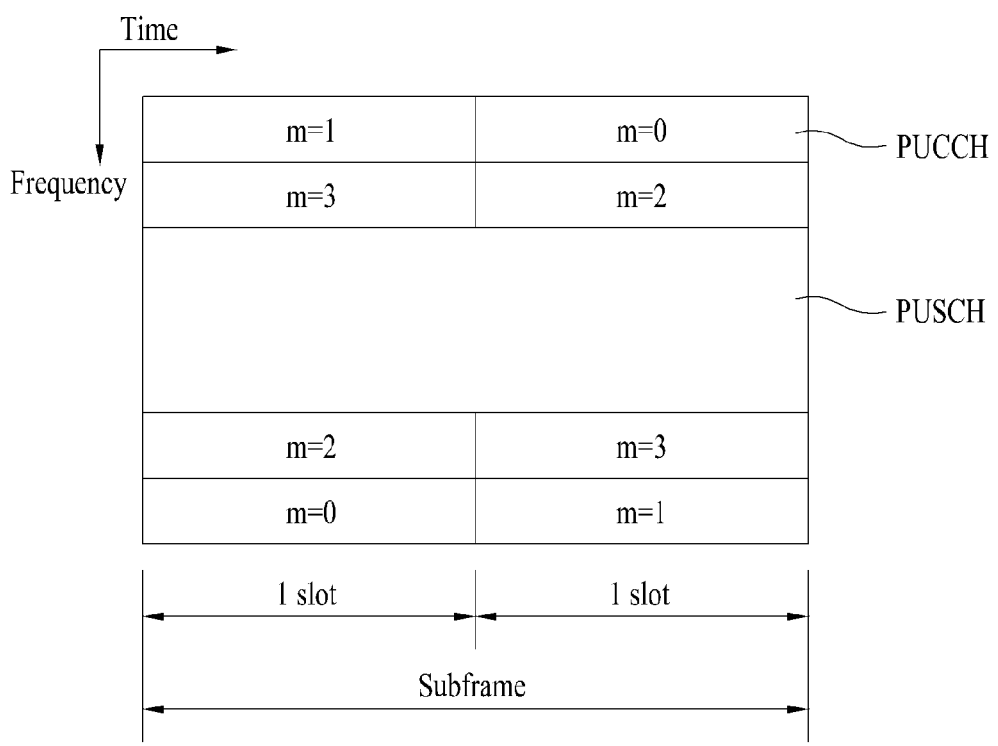
FIG. 5 illustrates an uplink subframe structure.

FIG. 5 illustrates an uplink subframe structure used in LTE.

Referring to FIG. 5, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.
- SR (scheduling request): This is information used to request a UL-SCH resource and is transmitted using On-Off Keying (OOK) scheme.
- HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.
- CQI (channel quality indicator): This is feedback information about a downlink channel. Feedback information regarding Multiple Input Multiple Output (MIMO) includes Rank Indicator (RI) and Precoding Matrix Indicator (PMI). 20 bits are used for each subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 2 shows the mapping relationship between PUCCH formats and UCI in LTE.

TABLE 2

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

Since an LTE UE cannot simultaneously transmit a PUCCH and a PUSCH, UCI (e.g. CQI/PMI, HARQ-ACK, RI, etc.) is multiplexed in a PUSCH region when the UCI needs to be transmitted through a subframe in which a PUSCH is transmitted. For example, when HARQ-ACK needs to be transmitted in a subframe allocated for PUSCH transmission, the UE multiplexes UL-SCH data and the HARQ-ACK prior to DFT-spreading, and then transmits control information and data through a PUSCH.

Figure 6:
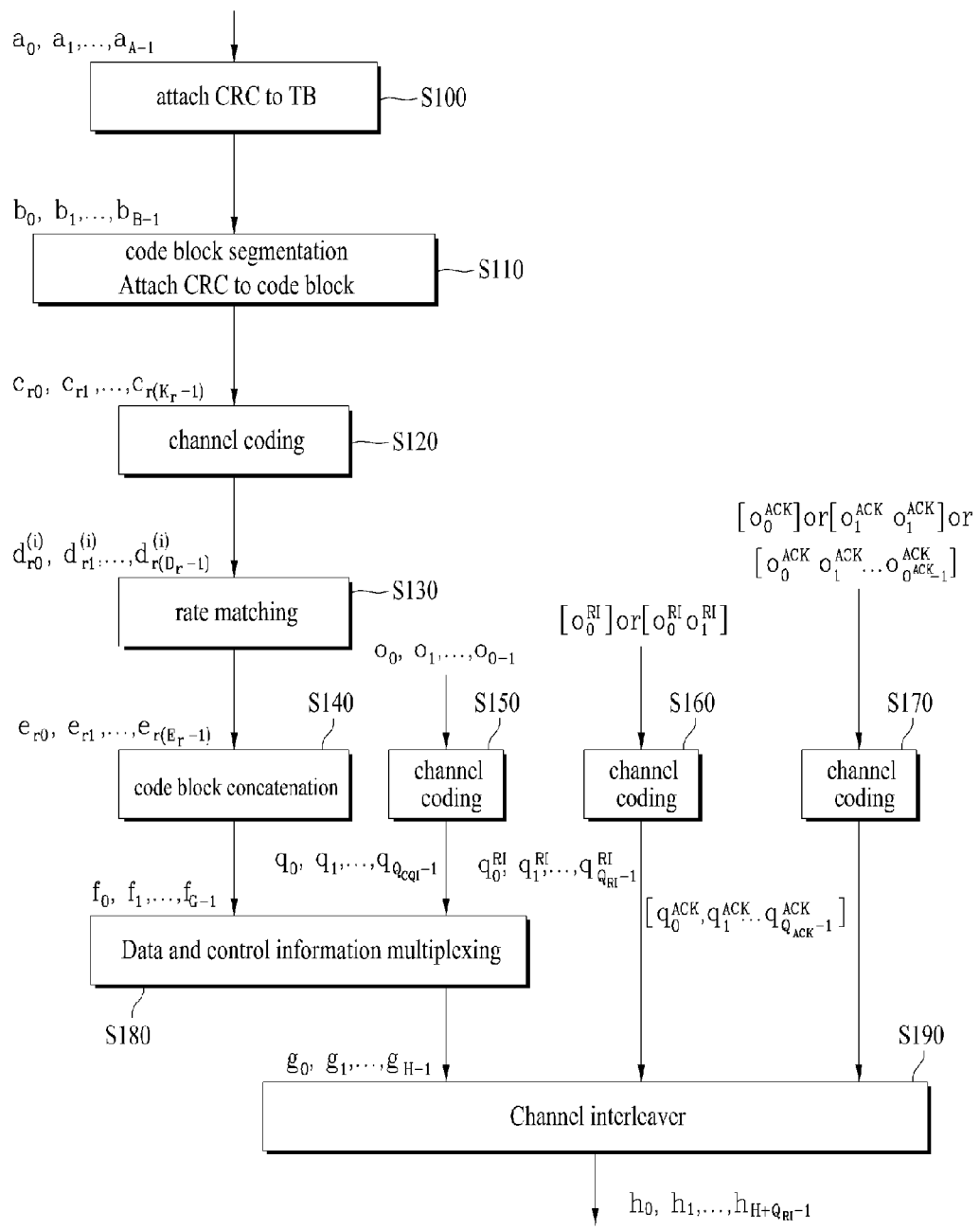
FIG. 6 illustrates a process of processing UL-SCH data and control information.

FIG. 6 illustrates a procedure of processing UL-SCH data and control information.

Referring to FIG. 6, error detection is performed in such a manner that a CRC (cyclic redundancy check) is attached to a UL-SCH transport block (TB) (S100).

The whole TB is used to calculate CRC parity bits. The TB has bits of $a_0, a_1, a_2, a_3, \ldots, a_{A-1}$. The parity bits are $p_0, P_1, p_2, p_3, \ldots, P_{L-1}$. The TB has a size of A and the number of parity bits is L.

After attachment of the CRC to the TB, code block segmentation and CRC attachment to a code block are performed (S110). Bits $b_0, b_1, b_2, b_3, b_{B-1}$ are input for code block segmentation. Here, B denotes the number of bits of the TB (including the CRC). Bits $c_{r0}, c_{r1}, c_{r2}, c_{r3}, \ldots, c_{r(Kr-1)}$ are obtained from code block segmentation. Here, r denotes a code block number (r=0, 1, ..., C−1), Kr denotes the number of bits of a code block r, and C denotes the total number of code blocks.

Channel coding follows code block segmentation and CRC attachment to a code block (S120). Bits $d^{(i)}_{r0}, d^{(i)}_{r1}, d^{(i)}_{r2}, d^{(i)}_{r3}, \ldots, d^{(i)}_{r(Kr-1)}$ are obtained from channel coding. Here, i=0, 1, 2 and Dr denotes the number of bits of an i-th coded stream for the code block r (i.e. DR=Kr+4). In addition, r denotes the code block number (r=0, 1, ..., C−1), Kr denotes the number of bits of the code block r, and C represents the total number of code blocks. Turbo coding may be used as channel coding.

Channel coding is followed by rate matching (S130). Bits $e_{r0}, e_{r1}, e_{r2}, e_{r3}, \ldots, e_{r(Er-1)}$ are obtained from rate matching. Here, Er denotes the number of rate-matched bits of an r-th code block (r=0, 1, ..., C−1) and C denotes the total number of code blocks.

Rate matching is followed by code block connection (S140). Bits $f_0, f_1, f_2, f_3, \ldots, f_{G-1}$ are obtained from code block connection. Here, G denotes the number of coded bits for transmission. When, control information transmission and UL-SCH transmission are multiplexed, bits used for control information transmission are not included in G. The bits $f_0, f_1, f_2, f_3, \ldots, f_{G-1}$ correspond to a UL-SCH codeword.

In case of UCI, channel quality information (CQI and/or PMI) $(o_0, o_1, \ldots, o_{o-1})$, RI $([o_0^{RI}]$ or $[o_0^{RI} o_1^{RI}])$ and HARQ-ACK $([o_0^{ACK}], [o_0^{ACK} o_1^{ACK}])$ or $$[o_0^{ACK} o_1^{ACK} o_{oACK-1}^{ACK}]$$

are independently channel-coded (S150 to S170). Channel coding of UCI is performed on the basis of the number of coded symbols for control information. For example, the number of coded symbols can be used for rate matching of coded control information. The number of coded symbols corresponds to the number of modulation symbols and the number of REs in the following process.

Channel coding of HARQ-ACK is performed using an input bit sequence $[o_0^{ACK}]$, $[o_0^{ACK} o_1^{ACK}]$ or $$[o_0^{ACK} \quad o_1^{ACK} \quad o_{oACK-1}^{ACK}]$$

of step S170. $[o_{00}^{ACK}]$ and $[o_0^{ACK} o_1^{ACK}]$ respectively correspond to 1-bit HARQ-ACK and 2-bit HARQ-ACK, and $$[o_0^{ACK} \quad o_1^{ACK} \quad o_{oACK-1}^{ACK}]$$

refers to HARQ-ACK composed of 3 bits or more (i.e. $O^{ACK}>2$). ACK is coded into 1 and NACK is coded into 0. Repetition coding is used for 1-bit HARQ-ACK. A (3, 2) simplex code is used for 2-bit HARQ-ACK and encoded data can be cyclically repeated. In case of $O^{ACK}>2$, a (32, 0) block code is used.

$Q_{ACK}$ denotes the total number of coded bits, and a bit sequence $q_0^{ACK}, q_1^{ACK}, Q_2^{ACK}, \ldots,$ $$q_{Q_{ACK}-1}^{ACK}$$

is obtained according to combination of coded HARQ-ACK blocks. To match the length of the bit sequence to $Q_{ACK}$, the last combined coded HARQ-ACK block may be part of the block (i.e. rate matching). $Q_{ACK}=Q'_{ACK}*Qm$, and $Q'_{ACK}$ is the number of coded symbols for HARQ-ACK, Qm is a modulation order. Qm corresponds to that of UL-SCH data.

The coded UL-SCH bits $f_0, f_1, f_2, f_3, \ldots, f_{G-1}$ and coded CQI/PMI bits $q_0, q_1, q_2, q_3, \ldots, Q_{CQI-1}$ are input to a data/control multiplexing block (S180). The data/control multiplexing block outputs bits $g_0, g_1, g_2, \ldots, g_{H'-1}$. $g_i$ is a column vector of length Qm (i=0, ..., H'-1). H'=H/Qm and H=(G+$Q_{CQI}$). H denotes the total number of coded bits allocated for UL-SCH data and CQI/PMI.

The output of the data/control multiplexing block, $g_0, g_1, g_2, \ldots, g_{H'-1}$, a coded rank indicator $q_0^{RI}, Q_1^{RI}, q_2^{RI}, \ldots, q_{Q'RI-1}$ and coded HARQ-ACK $q_0^{ACK}, q_1^{ACK}, q_2^{ACK}, \ldots$ $$q_{Q'_{ACK}-1}^{ACK}$$

are input to a channel interleaver (S190). $g_i$ is a column vector of length Qm for CQI/PMI, and i=0, ..., H'-1 (H'=H/Qm). $q_i^{ACK}$ is a column vector of length Qm for ACK/NACK, and i=0, ..., Q'$_{ACK-1}$ (Q'$_{ACK}$=$Q_{ACK}$/Qm). $q_i^{RI}$ is a column vector of length Qm for RI and i=0, ..., Q'$_{RI-1}$ (Q'$_{RI}$=$Q_{RI}$/Qm).

The channel interleaver multiplexes control information and UL-SCH data for PUSCH transmission. Specifically, the channel interleaver maps the control information and UL-SCH data to a channel interleaver matrix corresponding to a PUSCH resource.

The channel interleaver outputs a bit sequence $h_0, h_1, h_2, \ldots, h_{GH+QRI-1}$ read from the channel interleaver matrix column by column. The read bit sequence is mapped to a resource grid. H'=H'+Q'$_{RI}$ modulation symbols are transmitted through a subframe.

Figure 7:
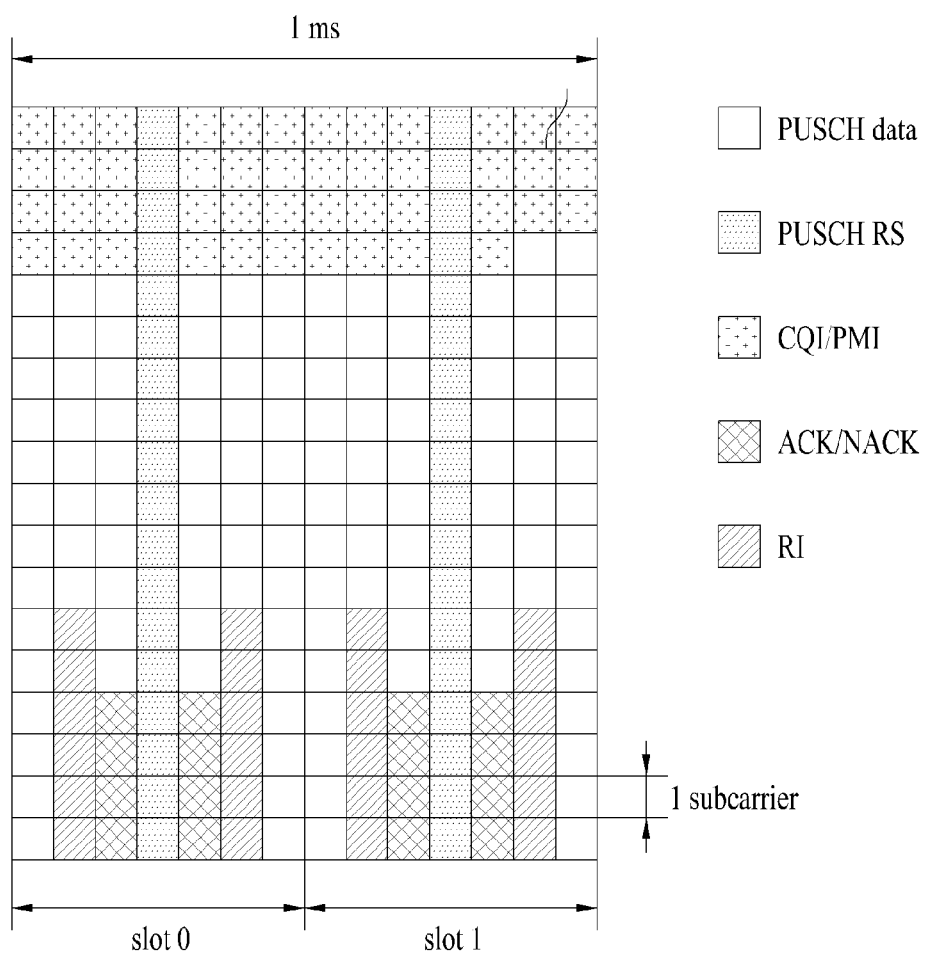
FIG. 7 illustrates multiplexing of control information and UL-SCH data on a PUSCH.

FIG. 7 illustrates multiplexing of control information and UL-SCH data on a PUSCH. When a UE attempts to transmit control information through a subframe to which PUSCH transmission is allocated, the UE multiplexes the control information (UCI) and UL-SCH data prior to DFT-spreading. The control information includes at least one of CQI/PMI, HARQ ACK/NACK and RI. The number of REs used for transmission of each of CQI/PMI, HARQ ACK/NACK and RI is based on a MCS (modulation and coding scheme) and an offset values $\Delta_{offset}^{CQI}$, $\Delta_{offset}^{HARQ-ACK}$ and $\Delta_{offset}^{RI}$ allocated for PUSCH transmission. The offset value performs different coding rates according to control information and is semi-statically set by a higher layer (e.g. RRC) signal. The UL-SCH data and control information are not mapped to the same RE. The control information is mapped such that the same occupies both slots of a subframe.

Referring to FIG. 7, CQI and/or PMI (CQI/PMI) resources are located at the start of a UL-SCH data resource, sequentially mapped to all SC-FDMA symbols on one subcarrier, and then mapped to the next subcarrier. CQI/PMI is mapped from left to right in a subframe, that is, in a direction in which an SC-FDMA symbol index increases. PUSCH data (UL-SCH data) is rate-matched in consideration of the quantity of CQI/PMI resources (i.e. the number of coded symbols). The same modulation order as the UL-SCH data is used for CQI/PMI. ACK/NACK is embedded into part of an SC-FDMA resource to which the UL-SCH data is mapped through puncturing. ACK/NACK is located beside an RS and mapped to SC-FDMA symbols from bottom to top, that is, in a direction in which a subcarrier index increases. In the case of normal CP, SC-FDMA symbols for ACK/NACK correspond to SC-FDMA symbols #2/#5 in each slot, as shown in FIG. 7. A coded RI is located beside a symbol for ACK/NACK irrespective of whether ACK/NACK is actually transmitted through the corresponding subframe.

In LTE, control information (using QPSK, for example) can be scheduled such that it is transmitted on a PUSCH without UL-SCH data. The control information (CQI/PMI, RI and/or ACK/NACK) is multiplexed before DFT-spreading in order to maintain low CM (cubic metric) single-carrier characteristics. ACK/NACK, RI and CQI/PMI are multiplexed in a manner similar to the process shown in FIG. 7.

SC-FDMA symbols for ACK/NACK are located by an RS, and a resource to which CQI is mapped can be punctured. The number of REs for ACK/NACK and RI is based on a reference MCS (CQI/PMI MCS) and an offset parameter $\Delta_{offset}^{CQI}$, $\Delta_{offset}^{HARQ-ACK}$ or $\Delta_{offset}^{RI}$. The reference MCS is calculated from a CQI payload size and resource allocation. Channel coding and rate matching for control signaling without UL-SCH data correspond to the above-described control signaling with UL-SCH data.

A description will be given of an ACK/NACK transmission process in a TDD system. TDD divides a frequency band into DL subframes and UL subframe in the time domain (refer to FIG. 2(b)). Accordingly, in case of asymmetrical DL/UL data traffic, a larger number of DL subframes or UL subframes may be allocated. Therefore, DL subframes may not one-to-one correspond to UL subframes in TDD. Particularly, when the number of DL subframes is larger than the number of UL subframes, a UE may need to transmit ACK/NACK responses to a plurality of PUSCHs (and/or PDCCHs requiring ACK/NACK responses) on a plurality of DL subframes through one UL subframe. For example, the ratio of the number of DL subframes to the number of UL subframes can be set as DL subframe:UL subframe=M:1 according to TDD. Here, M denotes the number of DL subframes corresponding to one UL subframe. In this case, the UE needs to transmit ACK/NACK responses to a plurality of PUSCHs (or PDCCHs requiring ACK/NACK responses) on M DL subframes through one UL subframe.

Figure 8:
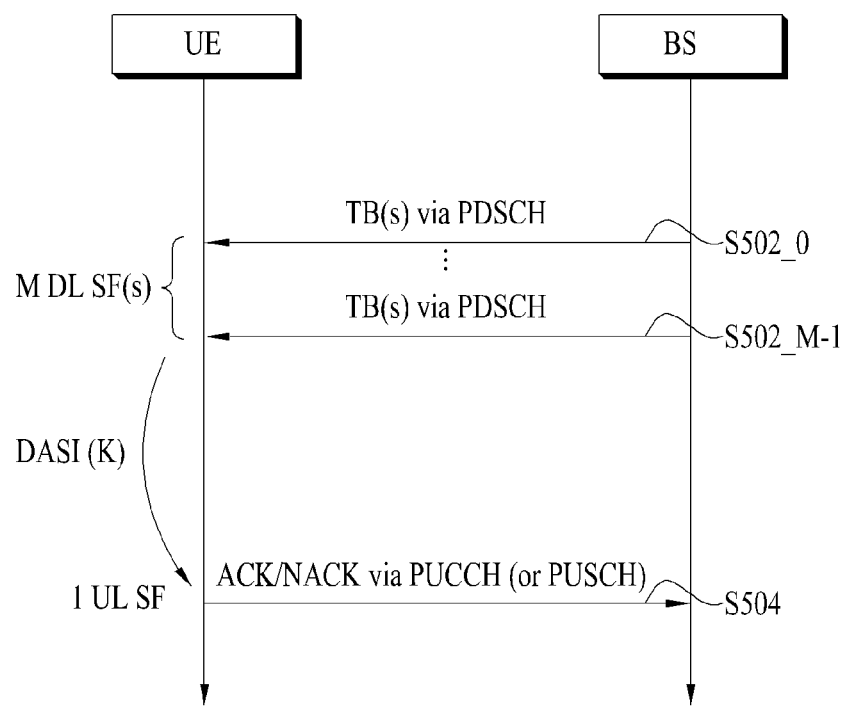
FIG. 8 illustrates a TDD UL ACK/NACK (uplink acknowledgement/negative acknowledgement) transmission procedure in a single cell situation.

FIG. 8 illustrates a TDD UL ACK/NACK transmission process in a single cell situation.

Referring to FIG. 8, a UE can receive one or more PDSCH signals in M DL subframes (SFs) (S502_0 to S502_M−1). Each PDSCH signal is used to transmit one or more (e.g. 2) transport blocks (TBs) (or codewords) according to transmission mode. A PDCCH signal requiring an ACK/NACK response, for example, a PDCCH signal indicating SPS (semi-persistent scheduling) release (simply, SPS release PDCCH signal) may also be received in step S502_0 to S502_M−1, which is not shown. When a PDSCH signal and/or an SPS release PDCCH signal are present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK can be transmitted through a PUSCH when a PUSCH is transmitted at ACK/NACK transmission time. Various PUCCH formats shown in Table 2 can be used for ACK/NACK transmission. To reduce the number of transmitted ACK/NACK bits, various methods such as ACK/NACK bundling and ACK/NACK channel selection can be used.

As described above, in TDD, ACK/NACK relating to data received in the M DL subframes is transmitted through one UL subframe (i.e. M DL SF(s):1 UL SF) and the relationship therebetween is determined by a DASI (downlink association set index).

Table 3 shows DASI (K:{k0, k1, . . . , $k_{M-1}$}) defined in LTE(-A). Table 3 shows spacing between a UL subframe transmitting ACK/NACK and a DL subframe relating to the UL subframe. Specifically, when a PDCCH indicating PDSCH transmission and/or (downlink) SPS release is present in a subframe n−k (k∈K), the UE transmits ACK/NACK in a subframe n.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

When a plurality of PDSCHs is transmitted to a single UE in a plurality of DL subframes, the BS transmits a PDCCH per PDSCH. Here, the UE transmits ACKs/NACKs for the plurality of PDSCHs through a PUCCH or a PUSCH on a UL subframe. In LTE, transmission of ACKs/NACKs for a plurality of PDSCHs is performed according to the following methods in a TDD mode.

1) ACK/NACK bundling: ACK/NACK bits for a plurality of data units (e.g. PDSCH, SPS release PDCCH, etc.) are combined according to a logical AND operation. For example, upon successful decoding of all data units, an Rx node (e.g. UE) transmits ACK signals. If any of data units has not been decoded (detected), the Rx node does not transmit a NACK signal or no signal.

2) PUCCH selection: Upon reception of a plurality of PDSCHs, a UE occupies a plurality of PUCCH resources for ACK/NACK transmission. ACK/NACK responses to the plurality of PDSCHs are discriminated according to combinations of PUCCH resources used for ACK/NACK transmission and transmitted ACK/NACK information (e.g. bit values).

In TDD, the following problem may be encountered when a UE transmits an ACK/NACK signal to a BS.

When the UE has missed some of PDCCH(s) transmitted from the BS in a plurality of subframes, the UE cannot be aware that PDSCHs corresponding to missed PDCCHs have been transmitted thereto. Accordingly, an error may be generated when ACK/NACK is generated.

To solve this problem, a DAI (downlink assignment index) is included in a PDCCH in a TDD system. The DAI indicates an accumulated value (i.e. counted value) of PDCCH(s) corresponding to PDSCH(s) from DL subframe(s) n−k (k∈K) to the current subframe and PDCCH(s) indicating SPS release. For example, when three DL subframes correspond to one UL subframe, PDSCHs transmitted in the three DL subframes are sequentially given indexes (sequentially counted) and transmitted on PDCCHs scheduling the PDSCHs. The UE can be aware that previous PDCCHs have been successfully received through DAI information included in the PDCCHs. A DAI included in a PDSCH-scheduling PDCCH and SPS release PDCCH is called. DAI-c (counter), or simply DAI for convenience.

Table 4 shows a value $V_{DAI}^{DL}$ indicated by a DL DAI field.

TABLE 4

| DAI MSB, LSB | $V_{DAI}^{DL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

MSB: Most Significant bit,
LSB: Least Significant Bit

Figure 9:
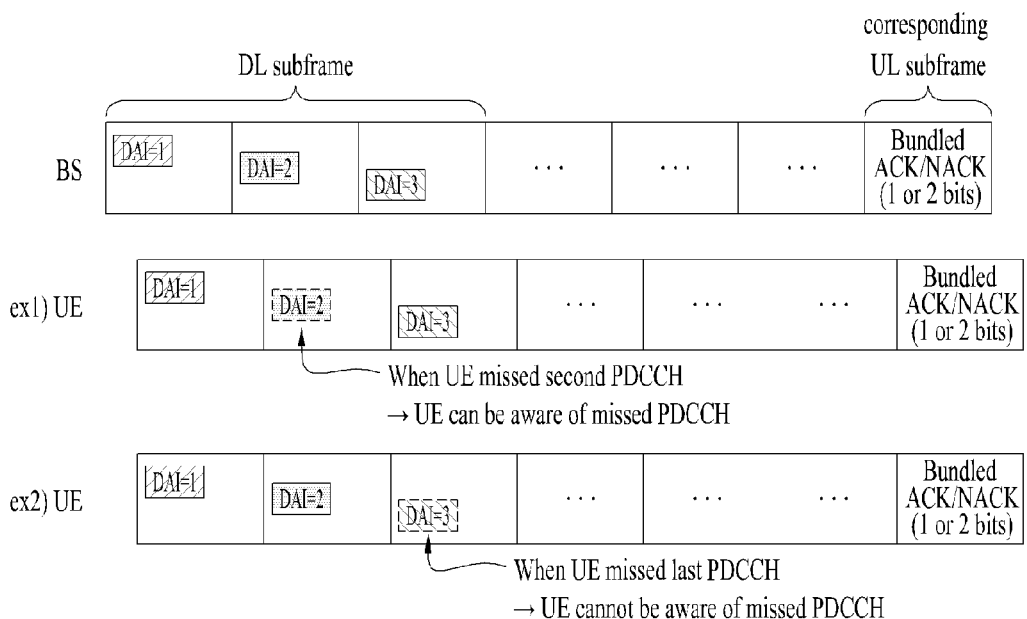
FIG. 9 illustrates ACK/NACK transmission using a DAI (downlink assignment index)

FIG. 9 illustrates ACK/NACK transmission using a DL DAI. This example is based on a TDD system with 3 DL subframes:1 UL subframe. It is assumed that a UE transmits ACK/NACK using a PUSCH resource. In LTE, when ACK/NACK is transmitted through a PUSCH, 1-bit or 2-bit bundled ACK/NACK is transmitted.

Referring to FIG. 9, when the UE misses the second PDCCH, the UE can be aware that the second PDCCH has been missed because a DL DAI value of the third PDCCH is different from the number of detected PDCCHs. In this case, the UE can process an ACK/NACK response to the second PDCCH as NACK (or NACK/DTX). When the UE misses the last PDCCH, the UE cannot be aware that the last PDCCH has been missed because a DAI value of the last detected PDCCH corresponds to the number of detected PDCCHs (i.e. DTX). Accordingly, the UE recognizes that only two PDCCHs have been scheduled during a DL subframe period. In this case, an error is generated during an ACK/NACK feedback process because the UE bundles only ACK/NACKs corresponding to the first two PDCCHs. To solve this problem, a PUSCH-scheduling PDCCH (i.e. UL grant PDCCH) includes a DAI field (UL DAI field). The UL DAI field is a 2-bit field and represents information about the number of scheduled PDCCHs.

Specifically, the UE assumes that at least one downlink allocation is lost (i.e. DTX is generated) when $V_{DAI}^{UL} \neq (U_{DAI}+N_{SPS}-1)$,mod 4+1 and generates NACK for all codewords according to bundling. Here, $U_{DAI}$ denotes the total number of DL grant PDCCHs and SPS release PDCCHs detected from a subframe n-k (k□K) (refer to Table 4) and $N_{sps}$ denotes the number of SPS PDSCHs and corresponds to 0 or 1.

Table 5 shows a value $V_{DAI}^{UL}$ indicated by the UL DAI field.

TABLE 5

| DAI MSB, LSB | $V_{DAI}^{UL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

MSB: Most Significant bit,
LSB: Least Significant Bit

Figure 10:
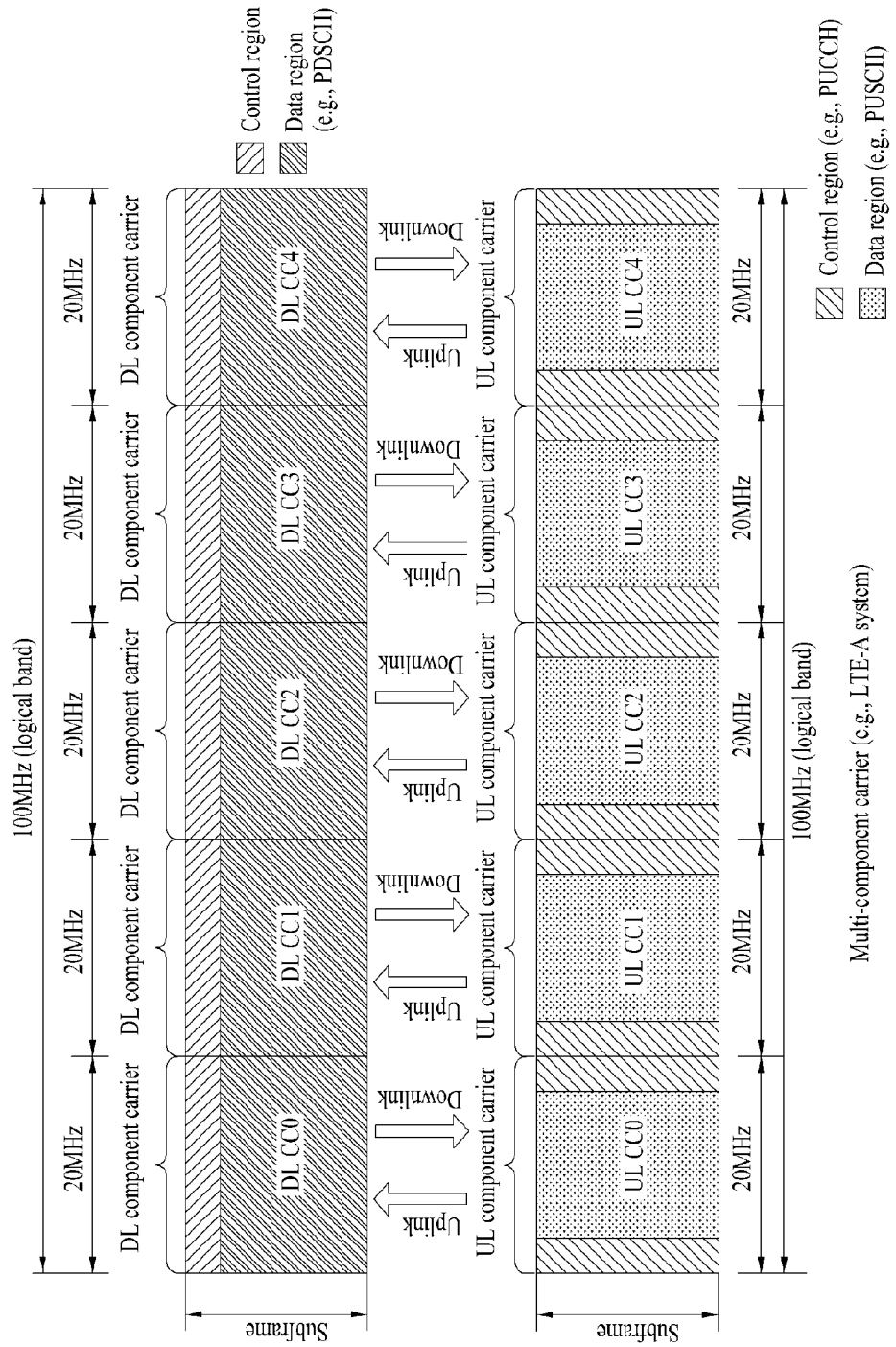
FIG. 10 illustrates a CA (carrier aggregation) communication system.

FIG. 10 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 10, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_CONNECTED state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 11:
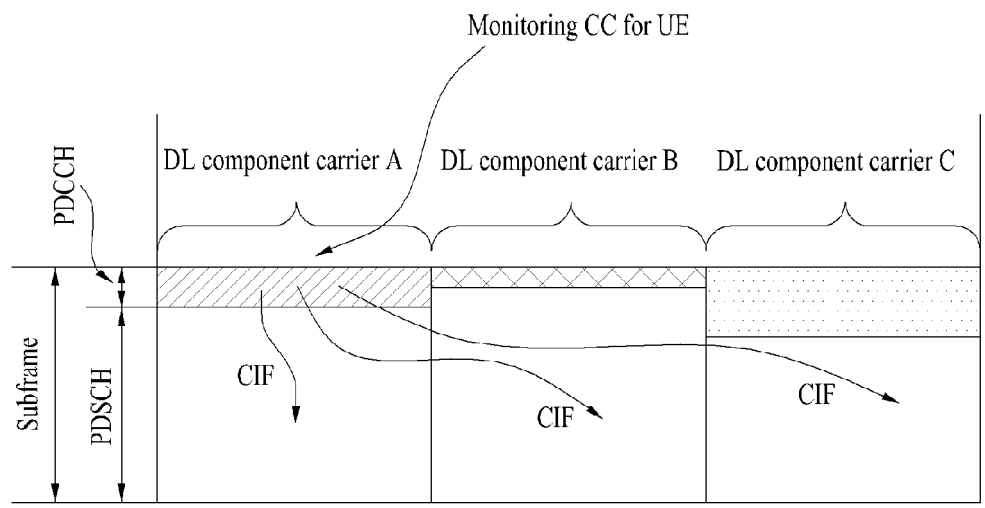
FIG. 11 illustrates cross-carrier scheduling.

FIG. 11 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF according to LTE PDCCH rule. When the CIF is enabled, DL CC A (monitoring DL CC) can transmit not only a PDCCH that schedules the PDSCH corresponding to the DL CC A but also PDCCHs that schedule PDSCHs of other DL CCs using the CIF. In this case, A PDCCH is not transmitted in DL CC B/C which is not set to a PDCCH monitoring DL CC.

ACK/NACK Transmission in CA Based TDD System

The following methods are additionally considered for ACK/NACK transmission in a CA based TDD system.

Full ACK/NACK scheme: this method can transmit a plurality of ACKs/NACKs corresponding to a maximum number of CWs (or TBs) which can be transmitted through all CCs allocated to a UE and a plurality of DL subframes (i.e. SF n-k (k∈K)) (refer to Table 3).

Bundled ACK/NACK scheme: this method can reduce the number of transmitted ACK/NACK bits by using at least one of CW bundling, CC bundling and subframe (SF) bundling and transmit ACK/NACK.

CW bundling refers to application of ACK/NACK bundling per CC to each DL SF. CW bundling is also referred to as spatial bundling. CC bundling refers to application of ACK/NACK bundling to all or some CCs in each DL SF. SF bundling refers to application of ACK/NACK bundling to all or some DL SFs in each CC. ACK/NACK bundling refers to a logical AND operation performed on a plurality of ACK/NACK responses.

Figure 12:
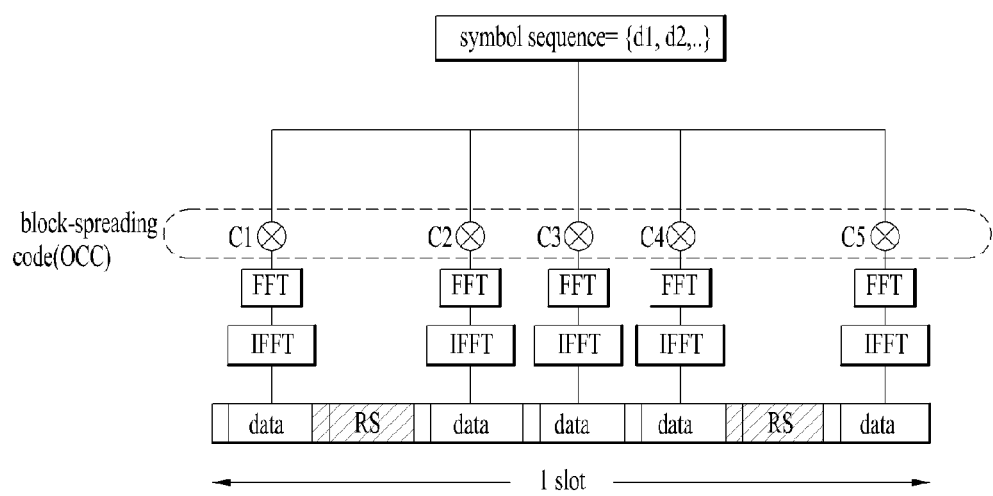
FIG. 12 illustrates a slot based E-PUCCH format.

FIG. 12 illustrates a E-PUCCH format in slot level. In the E-PUCCH format, a plurality of ACKs/NACKs is transmitted through joint coding (e.g. Reed-Muller coding, Tail-biting convolutional coding, etc.), block-spreading and SC-FDMA modulation.

Referring to FIG. 12, a symbol sequence is transmitted over a frequency domain and OCC (orthogonal cover code) based time-domain spreading is applied to the symbol sequence. Control signals of multiple UEs can be multiplexed into the same RB using an OCC. Specifically, 5 SC-FDMA symbols (i.e. UCI data part) are generated from one symbol sequence {d1, d2, ... } using an OCC (C1 to C5) with length-5 (SF (spreading factor) =5). Here, the symbol sequence {d1, d2, ... } may mean a modulated symbol sequence or a codeword bit sequence. When the symbol sequence {d1, d2, ... } refers to the codeword bit sequence, the block of FIG. 12 further includes a modulation block. While FIG. 12 shows that 2 RS symbols (i.e. RS part) are used for one slot, various applications such as using an RS part composed of 3 RS symbols and OCCs with SF=4 can be considered. Here, an RS symbol can be generated from a CAZAC (constant amplitude zero autocorrelation sequence) having a specific cyclic shift. Furthermore, an RS can be transmitted by applying (multiplying) a specific OCC to (by) a plurality of RS symbols in the time domain. For convenience, a channel coding based UCI (e.g. multiple ACK/NACK) transmission scheme using the E-PUCCH format is referred to as "multi-bit UCI coding" transmission scheme.

The E-PUCCH format shown in FIG. 12 corresponds to PUCCH format 3 of 3GPP TS (Technical Specification) 36.211 V10.1.0 (2011. 03), 36.212 V10.1.0 (2011. 03) and 36.213 V10.1.0 (2011. 03) published before the first priority date of the invention (2011. 05. 12). The E-PUCCH format and PUCCH format 3 are used in the same sense in the specification. A description will be given of an ACK/NACK payload configuration method for E-PUCCH format (i.e. PUCCH format 3) with reference to 36.213 V10.1.0 "7.3 UE procedure for reporting HARQ-ACK". An ACK/NACK payload for PUCCH format 3 is configured per CC and then configured ACK/NACK payloads are concatenated according to cell index order.

Specifically, HARQ-ACK feedback bits for a c-th serving cell (or DL CC) are given as $o_{c,0}^{ACK}, o_{c,1}^{ACK}, \ldots,$ $$O_{c,O_c^{ACK}-1}^{ACK}$$

(c≥0). $O_c^{ACK}$ represents the number of bits (i.e. size) of a HARQ-ACK payload for the c-th serving cell. When a transmission mode supporting single TB transmission is configured or spatial bundling is used for the c-th serving cell, $o_c^{ACK}$ can be set as $o_c^{ACK}=M$. If a transmission mode supporting transmission of multiple (e.g. 2) TBs is configured and spatial bundling is not used for the c-th serving cell, $o_c^{ACK}$ can be set as $o_c^{ACK}=2M$. M denotes the number of elements in a set K defined in Table 3.

When a transmission mode supporting single TB transmission is configured or spatial bundling is used for the c-th serving cell, the position of each HARQ-ACK bit in the HARQ-ACK payload of the serving cell corresponds to $o_{c,DAI(k)-1}^{ACK}$. DAI(k) represents a DL DAI value of a PDCCH detected from DL subframe n-k. When a transmission mode supporting transmission of multiple (e.g. 2) TBs is configured and spatial bundling is not used for the c-th serving cell, the position of each HARQ-ACK bit in the HARQ-ACK payload of the serving cell corresponds to $o_{c,2DAI(k)-2}^{ACK}$ and $o_{c,2DAI(k)-1}^{ACK}$. $o_{c,2DAI(k)-2}^{ACK}$ represents HARQ-ACK for codeword 0 and $o_{c,DAI(k)-1}^{ACK}$ represents HARQ-ACK for codeword 1. Codewords 0 and 1 respectively correspond to TBs 0 and 1 or TBs 1 and 0 according to swaping. When PUCCH format 3 is transmitted in a subframe configured for SR transmission, HARQ-ACK bit+SR 1-bit are transmitted through PUCCH format 3.

When a PUSCH is present at an ACK/NACK transmission time, a UL-SCH data payload is punctured (and/or rate-matched) and then ACK/NACK is multiplexed with UL-SCH data and transmitted on the PUSCH instead of a PUCCH (i.e. ACK/NACK piggybacking) (refer to FIGS. 6 and 7) in LTE. In a CA based TDD system, when a PUSCH is present at an ACK/NACK transmission time (e.g. in a UL subframe), full or bundled ACK/NACK can be piggybacked on the PUSCH. In this case, an ACK/NACK payload for PUSCH transmission can be configured in consideration of a configured. PUCCH format.

Figure 13:
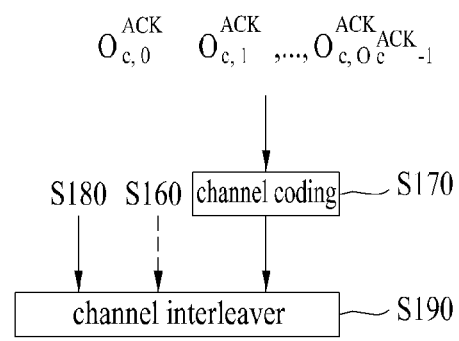
FIG. 13 illustrates a procedure of processing UL-SCH data and control information in transmission of ACK/NACK on a PUSCH when E-PUCCH format (i.e. PUCCH format) is set.

FIG. 13 illustrates a procedure of processing UL-SCH data and control information when ACK/NACK is transmitted on a PUSCH when the E-PUCCH format (i.e. PUCCH format 3) is configured. FIG. 13 shows a part related to ACK/NACK in the block diagram of FIG. 6.

Referring to FIG. 13, an ACK/NACK payload input to a channel coding block (S170) is configured according to a method defined for PUCCH format 3. That is, the ACK/NACK payload is configured per cell and then configured ACK/NACK payloads are concatenated according to cell index order. Specifically, HARQ-ACK feedback bits for a c-th serving cell (or DL CC) are given as $o_{c,0}^{ACK}$, $o_{c,1}^{ACK}$, ..., $$O_{c,O_c^{ACK}-1}^{ACK}$$

(c≥0). Accordingly, when a single serving cell is configured (c=0), $o_{0=0,0}^{ACK}$, $o_{c=0,1}^{ACK}$, ..., $$O_{c=0,O_{c=0}^{ACK}-1}^{ACK}$$

are input to the channel coding block (S170). Alternatively, when two serving cells are configured (c=0 and c=1), $o_{c=0}^{ACK}$, $o_{c=0,1}^{ACK}$, ..., $$O_{c=0,O_{c=0}^{ACK}-1}^{ACK} + O_{c=1,0}^{ACK}, O_{c=1,1}^{ACK}, \ldots, O_{c=1,O_{c=1}^{ACK}-1}^{ACK}$$

are input to the channel coding block (S170). Output bits of the channel coding block (S170) are input to a channel interleaver block (S190). Output bits of a data and control information multiplexing block (S180) and output bits of a channel coding block (S160) for an RI are also input to the channel interleaver block (S190). The RI is optionally present.

When ACK/NACK is transmitted on a PUSCH in the CA based TDD system, if a full or bundled ACK/NACK payload size increases due to large numbers of CCs, CWs and/or DL SFs, UL-SCH data throughput loss may occur since the number of ACK/NACK bits or symbols piggybacked on the PUSCH increases.

Embodiment: ACK/NACK Transmission Scheme of TDD System

To solve the above-described problem, information for determining/adjusting the size of an ACK/NACK payload piggybacked on a PUSCH or the number of REs used for ACK/NACK transmission is signaled through a PUSCH-scheduling PDCCH (i.e. UL grant PDCCH).

A PDSCH includes a PDSCH requiring an AKC/NACK response, for example, a PDSCH w/PDCCH and a PDSCH w/o PDCCH (e.g. SPS PDSCH) and a PDCCH includes a PDCCH requiring an ACK/NACK response, for example, an SPS release PDCCH unless otherwise mentioned in the following. A TDD configuration in which DL SF:UL SF=M:1 means that the number of DL SFs corresponding to a UL SF is M. That is, ACK/NACK for a DL signal (i.e. PDSCH and/or PDCCH) received through the M DL SFs can be transmitted through the corresponding UL SF.

Implementation 1: Adjustment of ACK/NACK Payload Size

A situation in which a DAI-counter (DAI-c) is operated per DL CC using a DAI field in a DL grant PDCCH, as in LTE (3GPP Rel-8) TDD, can be considered (here, the DAI-c can start from 0, 1 or an arbitrary number and it is assumed that the DAI-c starts from 1 for convenience). DAI-c is used interchangeably with DL DAI.

DAI-c (i.e. DL DAI): this can indicate the order of PDSCHs or DL grant PDCCHs scheduled on the basis of DL SF order. That is, a DAI-counter value can indicate an accumulated value (i.e. counted value) of PDCCH(s) corresponding to PDSCH(s) in DL subframes n-k (k∈K) up to the current subframe and PDCCH(s) indicating SPS release. The order indicated by the DAI-c can be an order of PDSCHs other than a PDSCH w/o PDCCH (e.g. SPS PDSCH). It is assumed that the DAI-c starts from 1 for convenience while it can start from 0, 1 or an arbitrary number. For example, when PDSCHs are scheduled through DL SFs #1 and #3, DAI-c values in PDCCHs scheduling the PDSCHs can be respectively signaled as 1 and 2. Considering a TDD configuration (e.g. UL-DL configuration #5 of Table 1) in which DL SF:UL SF=9:1 based on 2-bit DAI-c, the following modulo-4 operation is applicable.

DAI-c of the first, fifth or ninth scheduled PDSCH or DL grant PDCCH is 1.

DAI-c of the second or sixth scheduled PDSCH or DL grant PDCCH is 2.

DAI-c of the third or seventh scheduled PDSCH or DL grant PDCCH is 3.

DAI-counter of the fourth or eighth scheduled PDSCH or DL grant PDCCH is 4.

In this situation, it is possible to consider a method of signaling a maximum value (referred to as maxPDCCH-perCC for convenience) (equivalent to the number of DL subframes requiring ACK/ANCK feedback) from among the numbers of PDSCHs and/or PDCCHs (e.g. SPS release PDCCHs) scheduled/transmitted in respective DL CCs, through a PUSCH scheduling PDCCH. Since scheduling information about the PDSCH w/o PDCCH (e.g. SPS PDSCH) is known to both a BS and a UE, the PDSCH w/o PDCCH may be excluded from maxPDCCHperCC determination. If the DAI field of a PDCCH that schedules a PCC is used for other purposes (e.g. for designating/moving an ACK/NACK resource) instead of DAI-c, a method of signaling a maximum value from among the numbers of PDSCHs and/or PDCCHs scheduled/transmitted in DL CCs other than the PCC, through a PUSCH scheduling PDCCH, can be considered.

In this case, a UE can configure ACK/NACK payloads only for PDSCHs (or PDCCHs) and ACK/NACK positions corresponding to DAI-c values in the range of 1 to maxPDCCH-perCC (when DAI-c starts from 1) per DL CC. The number/position of ACK/NACK bits constituting an ACK/NACK payload for the corresponding DL CC can be determined based on a transmission mode (i.e. a maximum number of transmittable CWs) of the DL CC and whether or not CW bundling is present, instead of the number of instantaneously transmitted CWs (or TBs), as illustrated in FIG. 12, to prevent misalignment between the BS and the UE. maxPDCCH-perCC can be indicated through a DAI field (i.e. UL DAI field) in a UL grant PDCCH. Considering a TDD configuration in which DL SF:UL SF=9:1 based on a 2-bit UL DAI field, the following modulo-4 operation is applicable to maxPDCCHperCC that exceeds 4.

UL-DAI=1 when maxPDCCHperCC is 1, 5 or 9.

UL DAI=2 when maxPDCCHperCC is 2 or 6.

UL DAI=3 when maxPDCCHperCC is 3 or 7.

UL DAI=4 when maxPDCCHperCC is 4 or 8.

UL-DAI represents a value (referred to as $V_{DAI}^{UL}$ for convenience) indicated by the 2-bit UL-DAI field. $V_{DAI}^{UL}$ can be replaced by an arbitrary symbol (e.g. $W_{DAI}^{UL}$).

When a TDD UL-DL configuration in which DL SF:UL SF=M:1 is considered, the number of A/N payload bits, $O^{ACK}$, which is piggybacked on a PUSCH can be determined by Equation 1 according to maxPDCCHperCC, $N_{max,CC}$, received through UL-DAI $V_{DAI}^{UL}$. Here, maxPDCCHperCC and $N_{max,CC}$ can be replaced by arbitrary term/symbol (e.g. $B_c^{DL}$).

$$O^{ACK} = N_{max,CC}(C+C_2) \quad \text{[Equation 1]}$$

Here, $O^{ACK}$ denotes the total number of ACK/NACK feedback bits. That is, $O^{ACK}$ is the sum of the numbers of ACK/NACK feedback bits of CCs. $O^{ACK}$ is given as $$O^{ACK} = \sum_{c=0}^{C-1} O_c^{ACK}$$

and $O_c^{ACK}$ represents the number of ACK/NACK payload bits (i.e. size) for the c-th DL CC (or serving cell) (c≥0).

Here, $N_{max,CC}$ denotes a maximum number from among the numbers of PDSCHs and/or PDCCHs (e.g. SPS release PDCCHs) scheduled/transmitted in respective DL CCs. $N_{max,CC}$ has the same value in the corresponding DL CCs. That is, $N_{max,CC} = N_{max,c}$ (c≥0). Here, $N_{max,c}$ corresponds to a PDSCH and/or a PDCCH scheduled/transmitted in the c-th DL CC (or serving cell).

C denotes the number of CCs allocated to the UE and $C_2$ denotes the number of CCs which are set in a transmission mode supporting transmission of a plurality of (e.g. 2) transport blocks and to which spatial bundling is not applied. $C=C_1+C_2$ and $C_1$ represents the number of CCs which are set in a transmission mode supporting transmission of a single transport block or to which spatial bundling is applied.

Equations 2 and 3 are equivalent to Equation 1.

$$O^{ACK} = N_{max,CC} \times C_1 + 2 \times N_{max,CC} \times C_2 \quad \text{[Equation 2]}$$

$$O^{ACK} = \sum_{c=0}^{C-1} O_c^{ACK} = O_0^{ACK} + \ldots + O_{C-1}^{ACK} \quad \text{[Equation 3]}$$

$$O_c^{ACK} = \begin{cases} N_{max,CC} & \text{onetransportblockorspatialbundling} \\ 2 \times N_{max,CC} & \text{otherwise} \end{cases}$$

Here, C denotes the number of DL CCs (or serving cells) configured for the UE. $O_c^{ACK}$ corresponds to $N_{max,CC}$ when the c-th DL CC (or serving cell) is configured as the transmission mode supporting transmission of a single transport block or spatial bundling is applied thereto, and corresponds to $2 \times N_{max,CC}$ when the c-th DL CC (or serving cell) is configured as the transmission mode supporting transmission of a plurality of (e.g. 2) transport blocks and spatial bundling is not applied thereto.

Figure 14:
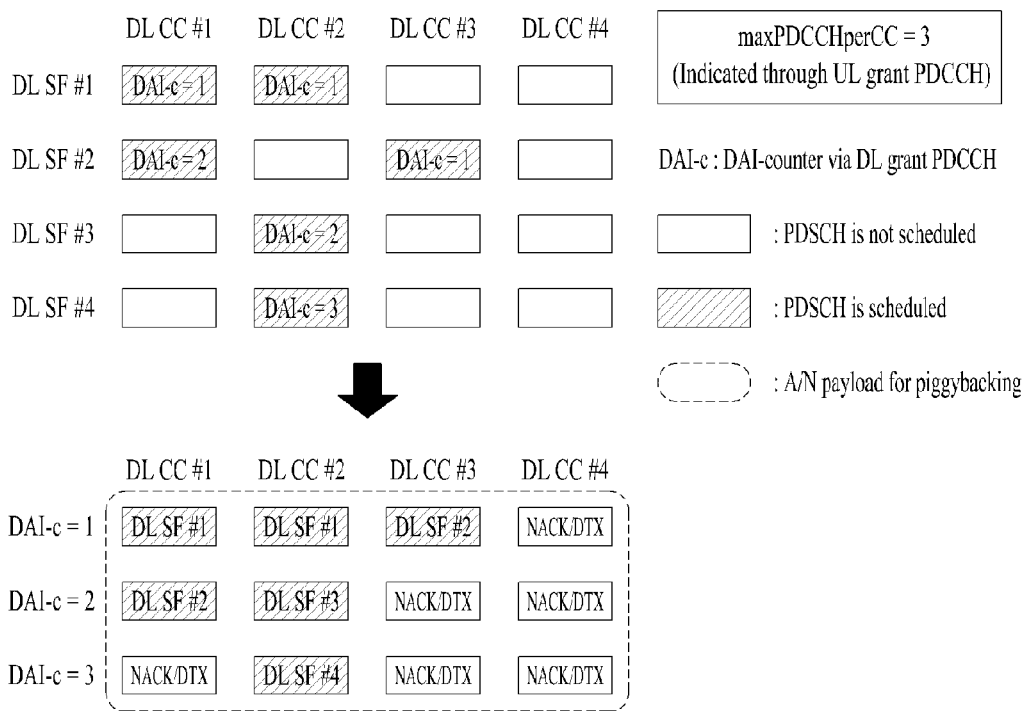
FIGS. 14, 15 and 16 illustrate ACK/NACK transmission according to an embodiment of the present invention.

FIG. 14 illustrates an exemplary ACK/NACK transmission scheme according to the present invention. In FIG. 14, 4 CCs are aggregated and ACK/NACK payloads are configured based on maxPDCCHperCC in a TDD configuration in which DL SF:UL SF=4:1 (i.e. M=4).

Referring to FIG. 14, since the numbers of PDSCHs scheduled/transmission for DL CCs #1, #2, #3 and #4 are 2, 3, 1 and 0, respectively, the maximum value (i.e. maxPDCCHperCC=3) from among the numbers of PDSCHs is indicated through a UL grant PDCCH. The UE configures ACK/NACK payloads only for PDSCH and ACK/NACK positions corresponding to DAI-c values in the range of the initial value to maxPDCCHperCC-1=2 per DL CC. Here, when an ACK/NACK position does not have a DAI-c value corresponding thereto (e.g. a PDCCH including a corresponding DAI-c value is not received or maxPDCCHperCC exceeds a maximum DAI-c value), the ACK/NACK position can be processed as NACK or DTX, as illustrated in FIG. 14.

When M≤4 as shown in FIG. 14, maxPDCCHperCC corresponds to $N_{max,CC} \le 4$ and thus the UE can determine that received UL DAI equals $N_{max,CC}$ (i.e. $V_{DAI}^{UL}=N_{max,CC}$). When M>4 (e.g. M=9) (TDD UL-DL configuration #5 of Table 5), however, the range of maxPDCCHperCC may correspond to $N_{max,CC} > 4$ (meanwhile, the range of UL DAI corresponds to $V_{DAI}^{UL} \le 4$) and thus it cannot be determined that $V_{DAI}^{UL}=N_{max,CC}$ all the time. To solve this problem, $N_{max,CC}$ is calculated in the following manner based on the fact that the probability that a case in which four or more DL grant PDCCHs fail to be detected per DL CC occurs for all CCs is very low. The following scheme is applicable to all UL-DL configurations or only to a specific UL-DL configuration (e.g. UL-DL configuration #5). In the latter case, the UE can determine that received UL DAI is same as $N^{max,CC}$ (i.e. $V_{DAI}^{UL}=N_{max,CC}$) for UL-DL configurations other than the specific UL-DL configuration.

Specifically, when the maximum value from among the numbers of PDSCHs and/or PDCCHs for respective CCs, which are actually received by the UE, is defined as $U_{max}$ (simply, U), the UE can calculate $N_{max,CC}$ by selecting a value L (integer equal to or greater than 0) that satisfies $4(L-1) < U_{max} 31 V_{DAI}^{UL} \le 4L$ and then adding 4L to received UL-DAI $V_{DAI}^{UL}$ according to equation 4.

$$N_{max,CC} = V_{DAI}^{UL} + 4L, \ 4(L-1) < U_{max} - V_{DAI}^{UL} \le 4L, \ L \ge 0 \quad \text{[Equation 4]}$$

In an equivalent manner, the UE can calculate the maxPDCCHperCC value, $N_{max,CC}$ using UL DAI $V_{DAI}^{UL}$ and the number of PDSCHs and/or PDCCHs corresponding to a CC through which a largest number of PDSCHs and/or PDCCHs is received, $U_{max}$, according to Equation 5.

$$N_{max,CC} = V_{DAI}^{UL} + 4 \lceil (U_{max} - V_{DAI}^{UL})/4 \rceil \quad \text{[Equation 5]}$$

Here, $\lceil \rceil$ denotes a ceiling function.

Figure 15:
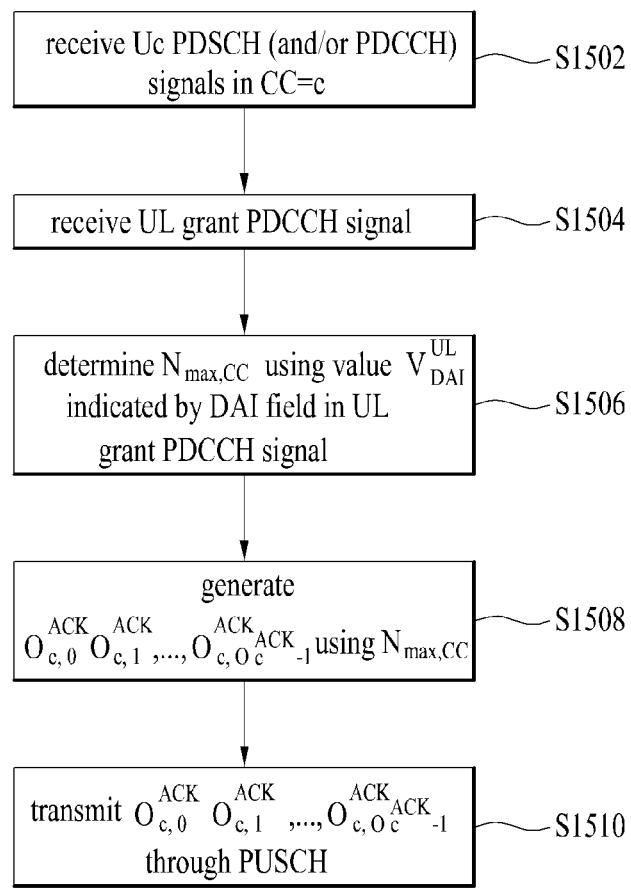
Figure 16:
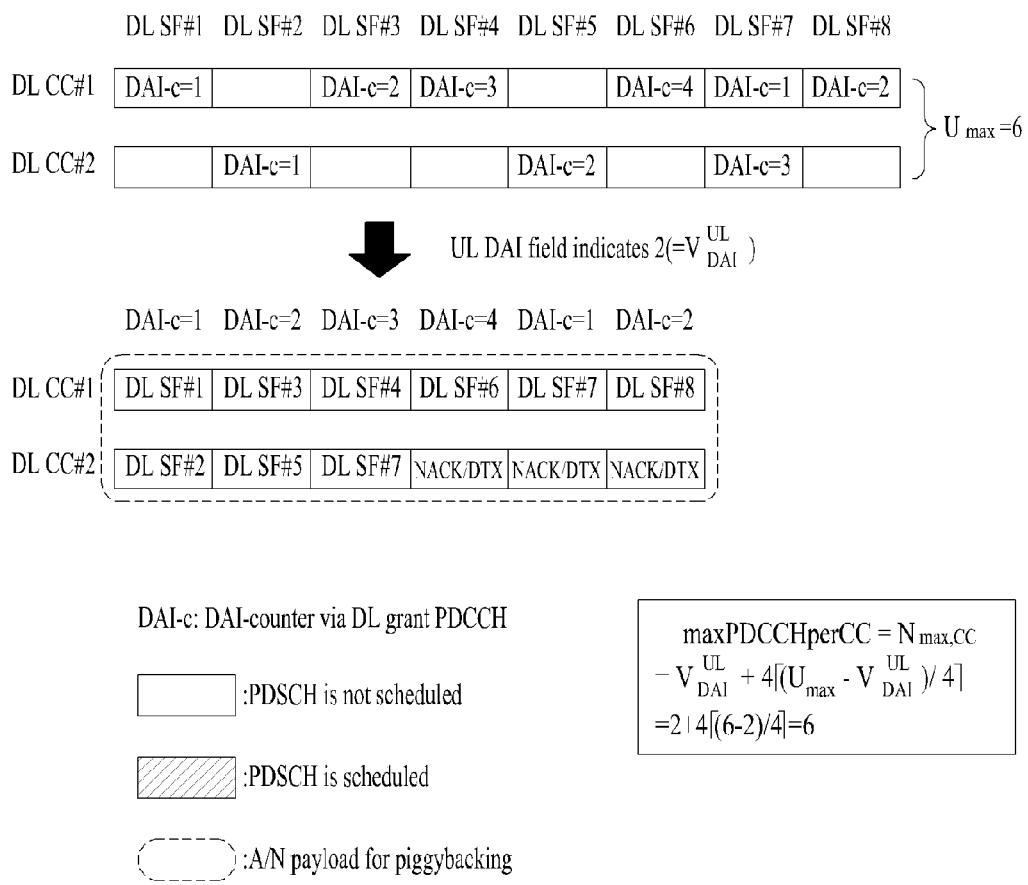

FIGS. 15 and 16 illustrate an ACK/NACK transmission procedure according to the method proposed above. While FIGS. 15 and 16 show ACK/NACK transmission operation performed by the UE, it is apparent that the BS performs operation opposite thereto.

Referring to FIG. 15, the UE receives $U_c$ PDSCH (and/or PDCCH) signals in CC=c (c≥0) (S1502). Then, the UE receives a UL grant PDCCH signal (S1504) and determines $N_{max,CC}$ using a value ($V_{DAI}^{UL}$) indicated by the DAI field in the UL grant PDCCH signal (S1506). $N_{max,CC}$ can be determined using Equations 4 and 5. However, the method of determining $N_{max,CC}$ is not limited thereto. Subsequently, the UE generates ACK/NACK feedback bits $$o_{c,0}^{ACK} o_{c,1}^{ACK}, \ldots, o_{c,O_c^{ACK}-1}^{ACK}$$

(i.e. an ACK/NACK payload per CC) for the c-th DL CC (or serving cell) using $N_{max,CC}$ (c≥0) (S1508). When a plurality of DL CCs is configured, ACK/NACK feedback bits per CC are sequentially concatenated according to cell index order, preferably, in ascending order and the UE transmits $$o_{c,0}^{ACK} o_{c,1}^{ACK}, \ldots, o_{c,O_c^{ACK}-1}^{ACK}$$

on a PUSCH through a signal processing procedure (e.g. channel coding, modulation, scrambling, etc.) for physical channel transmission (c≥0) (S1510).

Referring to FIG. 16, $U_{\#1}$=6 since 6 PDSCH and PDCCH signals have been received in DL CC#1 and $U\#_2$=3 since 3 PDSCH and PDCCH signals have been received in DL CC#2. Accordingly, $U_{max}$ is determined as 6, the maximum value between $U_{\#1}$ and $U_{\#2}$. The UL DAI field in the UL grant PDCCH indicates 2 and thus the maxPDCCHperCC value, $N_{max,CC}$, can be calculated as 6 according to Equation 5. Accordingly, the UE can configure ACK/NACK feedback bits per CC on the assumption of 6 PDSCH and PDCCH signals (or DAI-c values) per CC, as shown in FIG. 16. The number/position of ACK/NACK bits in the ACK/NACK payload per CC may be changed according to the transmission mode of the corresponding CC and whether or not spatial bundling is applied to the corresponding CC.

That is, an ACK/NACK payload size can be adjusted using UL DAI. Specifically, the size of an ACK/NACK payload (in other words, ACK/NACK part) per CC can be determined based on a UL DAI value, a transmission mode of the corresponding CC and whether or not bundling is applied to the corresponding CC. In addition, the position of ACK/NACK in the ACK/NACK payload per CC can be determined using a DL DAI value received in the corresponding DL CC.

Specifically, it is assumed that HARQ-ACK feedback bits (in other words, ACK/NACK payload) for the c-th DL CC (or serving cell) are defined as $$o_{c,0}^{ACK} o_{c,1}^{ACK}, \ldots, o_{c,O_c^{ACK}-1}^{ACK}$$

(c≥0). $O_c^{ACK}$ represents the number of HARQ-ACK payload bits (i.e. HARQ-ACK payload size) for the c-th DL CC. When a transmission mode supporting transmission of a single transport block is configured for or spatial bundling is applied to the c-th DL CC, $O_c^{ACK}$ can be given as $O_c^{ACK}=B_c^{DL}$. If a transmission mode supporting transmission of a plurality of (e.g. 2) transport blocks is configured for the c-th DL CC and spatial bundling is not applied thereto, $O_c^{ACK}$ can be given as $O_c^{ACK}=2B_c^{DL}$. Here, $B_c^{DL}$ is another expression of $N_{max,CC}$. Accordingly, $B_c^{DL}$ can be determined using Equation 4.

When a transmission mode supporting transmission of a single transport block is configured for or spatial bundling is applied to the c-th DL CC, the position of ACK/NACK in an HARQ-ACK payload per CC is given as $o_{c,DAI(k)-1}^{ACK}$. DAI (k) denotes a DL DAI value of a PDCCH detected in a DL subframe n-k. On the other hand, when a transmission mode supporting transmission of a plurality of (e.g. 2) transport blocks is configured for the c-th DL CC and spatial bundling is not applied thereto, the position of ACK/NACK in the HARQ-ACK payload per CC is given as $o_{c,2DAI(k)-2}^{ACK}$ and $o_{c,2DAI(k)-1}^{ACK}$. Here, $o_{c,2DAI(K)-2}^{ACK}$ represents HARQ-ACK for codeword 0 and $o_{c,2DAI(k)-1}^{ACK}$ represents HARQ-ACK for codeword 1.

Implementation 2: Adjustment of the Number of REs used for ACK/NACK Transmission ACK piggybacking based on UL DAI signaling of maxP-DCCHperCC may be suitable when DL scheduling is uniformly performed on all CCs. When DL scheduling is performed (or concentrated) on only one CC or a few CCs, an unnecessarily high maxPDCCHperCC value can be applied to all CCs. In this case, the number of ACK/ANCK modulation symbols occupied in a PUSCH or the number of REs used for ACK/ANCK transmission can increase, causing unnecessary overhead.

Accordingly, a method for adjusting the number of REs used for ACK/NACK transmission in a PUSCH (instead of the number of piggybacked ACK/NACK payload bits) through a UL grant PDCCH (e.g. using the UL DAI field) can be considered. Equation 5 represents the number of coded modulation symbols for HARQ-ACK when a single UL-SCH transport block is transmitted on a UL CC. Equation 6 represents the number of coded modulation symbols for HARQ-ACK when two UL-SCH transport blocks are transmitted on a UL CC. The number of coded modulation symbols for HARQ-ACK is equivalent to the number or REs for HARQ-ACK.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{OUSCH}\right)$$ [Equation 5]

$$Q' = \max[\min(Q'_{temp}, 4 \cdot M_{sc}^{PUSCH}), Q'_{min}]$$ [Equation 6]

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C(1)-1} K_r^{(1)} \cdot M_{sc}^{PUSCH-initial(2)} \cdot N_{symb}^{PUSCH-initial(2)} + \sum_{r=0}^{C(2)-1} K_r^{(2)} \cdot M_{sc}^{PUSCH-initial(1)} \cdot N_{symb}^{PUSCH-initial(1)}} \right\rceil$$

Here, Q' denotes the number of coded modulation symbols per layer and O denotes the number of HARQ-ACK bits. $M_{sc}^{PUSCH}$ represents a bandwidth (on a subcarrier basis) scheduled for PUSCH transmission of the transport block in the current subframe and $M_{sc}^{PUSCH-initial}$ represents a bandwidth (on a subcarrier basis) scheduled for initial PUSCH transmission of the same transport block. In addition $N_{symb}^{PUSCH-initial}$ represents the number of SC-FDMA symbols per subframe for initial PUSCH transmission of the same transport block and $N_{symb}^{PUSCH-initial}=(2 \cdot (N_{symb}^{UL}-1)-N_{SRS})$. $N_{symb}^{UL}$ denotes the number of SC-FDMA symbols in an uplink slot and $N_{SRS}$ is a value related to SRS transmission and has a value of 0 or 1. $B_{offset}^{PUSCH}$ represents an offset value and C represents the number of code blocks for the same transport block. In addition, $K_r$ is the payload size of code block r where the subscript represents a layer number. $Q'_{min}$ denotes a lower limit of a coded modulation symbol.

In this example, the number of ACK/NACK payload bits piggybacked on PUSCH, $O^{ACK}$, in a TDD configuration in which DL SF:UL SF=M:1 can be determined as follows irrespective of UL DAI.

$$O^{ACK}=M(C+C_2) \qquad \text{[Equation 7]}$$

Here, C denotes the number of CCs and $C_2$ denotes the number of CCs for which a transmission mode supporting transmission of a maximum of 2 transport blocks is configured and spatial bundling is not applied.

The number of REs used for ACK/NACK transmission in a PUSCH can be adjusted according to a received UL DAI value as follows. Specifically, if N-bit (e.g. N=2) UL DAI (capable of representing $2^N$ states) is used, parameter O used in Equations 5 and 6 can be calculated as $2^N$ values less than $O^{ACK}$ according to the UL DAI value. In the present embodiment, the number of REs used for ACK/NACK transmission in a PUSCH can be controlled through UL DAI signaling, distinguished from the method of determining the number of ACK/NACK payload bits based on maxPDCCHperCC. Accordingly, $2^N$ UL DAI values can be used irrespective of M.

For example, when N-bit UL DAI is defined as $V_{DAI}^{UL} \in \{1, \ldots, 2^N\}$, parameter O can be given as follows according to a received UL DAI value. $VL_{DAI}^{UL}$ is a symbol defined for convenience and can be replaced by an arbitrary symbol (e.g. $W_{DAI}^{UL}$).

$$O=N_{RE}(C+C_2) \qquad \text{[Equation 8]}$$

Here, parameter $N_{RE}$ which adjusts the number of REs can be calculated in a manner similar to implementation 1. $N_{RE}$ is a symbol defined for convenience and can be replaced by an arbitrary sign.

Specifically, when N=2, if the maximum value from among the numbers of PDSCHs and/or PDCCHs for respective CCs, which are actually received by the UE, is defined as $U_{max}$ (simply, U), the UE can calculate $N_{RE}$ by selecting a value L (integer equal to or greater than 0) that satisfies $4(=2^N) \times (L-1) < U_{max} - V_{DAI}^{UL} \leq 4(=2^N) \times L$ and then adding $4(=2^N) \times L$ to received UL-DAI $V_{DAI}^{UL}$ according to Equation 9. If L that satisfies Equation 9 is not present, ACK/NACK transmission on a PUSCH can be dropped.

$$N_{RE}=V_{DAI}^{UL}+4(=2^N)\times L,\ 4(=2^N)\times(L-1)<U_{max}-V_{DAI}^{UL}\leq 4(=2^N)\times L,\ L\geq 0 \qquad \text{[Equation 9]}$$

In an equivalent manner, the UE can calculate $N_{RE}$ using UL-DAI $V_{DAI}^{UL}$ and the number $U_{max}$ of PDSCHs and/or PDCCHs corresponding to a CC through which a largest number of PDSCHs and/or PDCCHs is received, according to Equation 10.

$$N_{RE}=V_{DAI}^{UL}+4(=2^N)\times\lceil(U_{max}-V_{DAI}^{UL})/4(=2^N)\rceil \qquad \text{[Equation 10]}$$

For the above-described two implementations, one or more PUSCHs can be transmitted through one or more CCs in a specific UL SF and a PUSCH (i.e. PUSCH w/o PDCCH, e.g. SPS PUSCH) transmitted without being scheduled by a UL grant PDCCH can be included in one or more PUSCHs in the CA based TDD system. If a PUSCH w/o PDCCH is selected for ACK/NACK piggybacking, it is desirable to perform ACK/NACK piggybacking on the PUSCH by applying $O=O^{ACK}=M(C+C_2)$ thereto.

The methods according to implementation 1 and implementation 2 may be simultaneously implemented in a system. In this case, one method can be applied to all UEs through a cell-specific configuration or a corresponding method can be independently applied per CC through a UE-specific configuration.

Figure 17:
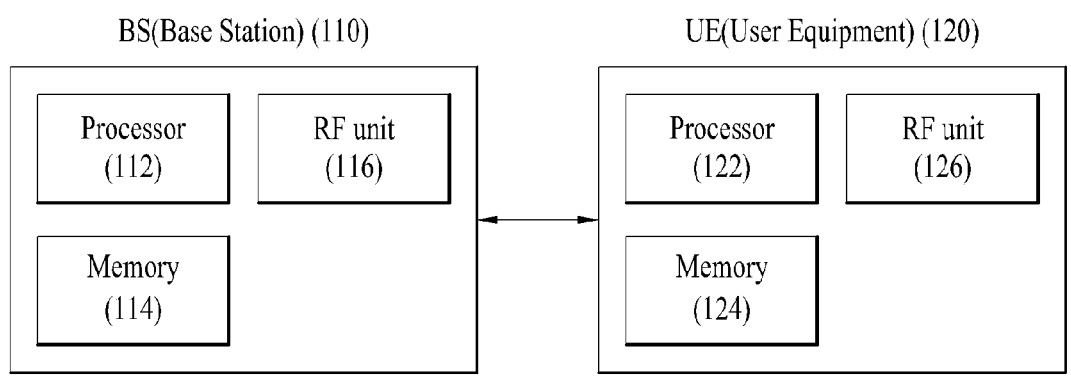
FIG. 17 illustrates a base station (BS) and UE applicable to the present invention.

FIG. 17 illustrates a BS and a UE applicable to embodiments of the present invention.

Referring to FIG. 17, a wireless communication system includes a BS 110 and a UE 120. The BS includes a processor 112, a memory 114, an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122, transmits and/or receives an RF signal. The BS 110 and/or UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication devices such as a UE, a relay, a BS, etc.

The invention claimed is:

1. A method for transmitting uplink control information in a wireless communication system supporting carrier aggregation and operating in time division duplex (TDD), the method comprising:
    receiving at least one of one or more physical downlink control channels (PDCCHs) and one or more physical downlink shared channels (PDSCHs) in a plurality of downlink subframes according to an uplink-downlink (UL-DL) configuration;
    determining a number of bits of acknowledgement/negative acknowledgement (ACK/NACK) information on the at least one of one or more PDCCHs and the one or more PDSCHs using a value indicated by a predetermined 2-bit field in a downlink control information (DCI) format for UL scheduling; and
    transmitting the number of bits of ACK/NACK information through a physical uplink shared chnnel (PUSCH) corresponding to the DCI format,
    wherein the number of bits of ACK/NACK information is determined using:

$V_{DAI}^{UL}+4\lceil(U_{max}-V_{DAI}^{UL})/4\rceil$ wherein $V_{DAI}^{UL}$ denotes the value indicated by the predetermined 2-bit field and is an integer in a range of 1 to 4, $U_{max}$ denotes a maximum value from among a plurality of PDSCH signals and PDCCH signals received in the plurality of downlink subframes for respective component carriers, and $\lceil\ \rceil$ represents a ceiling function.

2. The method according to claim 1, wherein the number of bits of ACK/NACK information is identical to a value determined using:

$V_{DAI}^{UL}+4\lceil(U_{max}-V_{DAI}^{UL})/4\rceil)\times(C+C_2)$ wherein C denotes a number of configured component carriers, and $C_2$ denotes a number of component carriers supporting a maximum of 2 transport blocks and to which bundling is not applied.

3. The method according to claim 1, wherein the number of bits of ACK/NACK information indicate one or more component carriers and the number of bits of ACK/NACK information for a c-th component carrier is:
    i) $V_{DAI}^{UL}+4\lceil(U_{max}-V_{DAI}^{UL})/4\rceil)$ when a transmission mode supporting transmission of a single transport block is configured for the c-th component carrier or bundling is applied for the c-th component carrier; and
    ii) $2\times(V_{DAI}^{UL}+4\lceil(U_{max}-V_{DAI}^{UL})/4\rceil)$ when a transmission mode supporting transmission of two transport blocks is configured for the c-th component carrier and bundling is not applied thereto.

4. The method according to claim 1, wherein $V_{DAI}^{UL}+4\lceil(U_{max}-V_{DAI}^{UL})/4\rceil$ corresponds to a number of downlink subframes requiring feedback of ACK/NACK information for a corresponding component carrier.

5. A communication device configured to transmit uplink control information in a wireless communication system supporting carrier aggregation and operating in time division duplex (TDD), comprising:
    a radio frequency (RF) unit; and
    a processor,
    wherein the processor is configured to receive at least one of one or more physical downlink control channels (PDCCHs) and one or more physical downlink shared channels (PDSCHs) in a plurality of downlink subframes according to an uplink-downlink (UL-DL) configuration, to determine a number of bits of acknowledgement/negative acknowledgement (ACK/ACK) information on the at least one of one or more PDCCHs and the one or more PDSCHs using a value indicated by a predetermined 2-bit field in a downlink control information (DCI) format for UL scheduling, and to transmit the ACK/NACK information through a physical uplink shared channel (PUSCH) corresponding to the DCI format,
    wherein the number of bits of ACK/NACK information is determined using:

$V_{DAI}^{UL}+4\lceil(U_{max}-V_{DAI}^{UL})/4\rceil$ wherein $V_{DAI}^{UL}$ denotes the value indicated by the predetermined 2-bit field and is an integer in a range of 1 to 4, $U_{max}$ denotes a maximum value from among a plurality of PDSCH signals and PDCCH signals received in the plurality of downlink subframes for respective component carriers and $\lceil\ \rceil$ represents a ceiling function.

6. The communication device according to claim 5, wherein the number of bits of the ACK/NACK information is identical to a value determined using:

$(V_{DAI}^{UL}+4\lceil(U_{max}-V_{DAI}^{UL})/4\rceil)\times(C+C_2)$ wherein C denotes a number of configured component carriers, and $C_2$ denotes a number of component carriers supporting a maximum of 2 transport blocks and to which bundling is not applied.

7. The communication device according to claim 5, wherein the number of bits of ACK/NACK information indicate one or more component carriers and the number of bits of ACK/NACK information for a c-th component carrier is:
    i) $(V_{DAI}^{UL}+4\lceil(U_{max}-V_{DAI}^{UL})/4\rceil)$ when a transmission mode supporting transmission of a single transport block is configured for the c-th component carrier or bundling is applied for the c-th component carrier; and
    ii) $2\times(V_{DAI}^{UL}+4\lceil(U_{max}-V_{DAI}^{UL})/4\rceil)$ when a transmission mode supporting transmission of two transport blocks is configured for the c-th component carrier and bundling is not applied thereto.

8. The communication device according to claim 5, wherein $V_{DAI}^{UL}+4\lceil(U_{max}-V_{DAI}^{UL})/4\rceil$ corresponds to a number of downlink subframes requiring feedback of ACK/NACK information for a corresponding component carrier.

* * * * *